(12) United States Patent
Chiang (10) Patent No.: US 6,794,572 B1
(45) Date of Patent: Sep. 21, 2004

(54) LATCH DEVICE FOR ELECTRIC WALL BOX

(76) Inventor: Ching Hua Chiang, P.O.Box 65-45, Taichung (TW), 403

( * ) Notice: Subject to any disclaimer, the term of this patent is extended or adjusted under 35 U.S.C. 154(b) by 0 days.

(21) Appl. No.: 10/673,404

(22) Filed: Sep. 26, 2003

(51) Int. Cl.$^7$ ................................................ H02G 3/08
(52) U.S. Cl. ............................ 174/50; 174/135; 70/369; 70/495
(58) Field of Search .................. 174/50, 135; 220/4.02; 70/495, 369, 419, 496, 141, 50; 312/221

(56) References Cited

U.S. PATENT DOCUMENTS

| | | | | |
|---|---|---|---|---|
| 4,404,824 A | * | 9/1983 | Hennessy | 70/495 |
| 5,184,887 A | * | 2/1993 | O'Keefe et al. | 312/221 |
| 5,491,992 A | * | 2/1996 | Mandall | 70/232 |
| 5,797,285 A | * | 8/1998 | Sackowitz | 70/177 |
| 5,921,117 A | * | 7/1999 | Illguth | 70/159 |
| 6,530,250 B1 | * | 3/2003 | Linares et al. | 70/208 |
| 6,698,258 B2 | * | 3/2004 | Westwinkel | 70/85 |
| 6,743,977 B1 | * | 6/2004 | Sterett | 174/50 |

* cited by examiner

*Primary Examiner*—Dhiru R Patel (57) ABSTRACT

A latch device for a wall box includes a stem slidably attached to a housing, a catch secured to the stem for engaging with the housing, and a spring may bias the catch away from the housing. A hand grip is pivotally attached to the stem, a pole is secured to the hand grip and includes a lock groove, a bar is slidably attached to the housing and includes an actuator flange for selectively engaging into the lock groove of the pole, to selectively lock the pole and the hand grip to the housing. A magneto or a lock may be used for disengaging the actuator flange from the lock groove of the pole, to selectively release the hand grip from the housing.

12 Claims, 10 Drawing Sheets

LATCH DEVICE FOR ELECTRIC WALL BOX

BACKGROUND OF THE INVENTION

1. Field of the Invention

The present invention relates to a wall box, and more particularly to a wall box for receiving electric wires or cables and having a latch device for allowing the wall box to be easily opened by users.

2. Description of the Prior Art

Typical wall boxes have been developed and provided for attaching or mounting into wall members, and for receiving electric wires or cables, and having a latch device for locking the cover of the wall box.

However, the typical wall boxes comprise a lock or latch device that may not be easily operated or opened by the users. Normally, the typical wall boxes comprise a button required to be depressed by the users before the lock or latch device may be actuated or operated by the users. However, the buttons may not be easily depressed by the users.

The present invention has arisen to mitigate and/or obviate the afore-described disadvantages of the conventional lock or latch devices for the wall boxes.

SUMMARY OF THE INVENTION

The primary objective of the present invention is to provide a latch device for a wall box for receiving electric wires or cables and for allowing the wall box to be easily actuated or opened by users without depressing any buttons.

In accordance with one aspect of the invention, there is provided a latch device for a wall box, the latch device comprising a housing, a stem slidably attached to the housing, a catch secured to the stem, for engaging with the housing to lock the stem to the housing, a first spring for biasing the catch away from the housing, a hand grip pivotally attached to the stem, for rotating the stem relative to the housing, a pole secured to the hand grip and including a lock groove formed therein, a bar slidably attached to the housing, and including an actuator flange provided therein for selectively engaging into the lock groove of the pole, to selectively lock the pole and the hand grip to the housing, and means for disengaging the actuator flange from the lock groove of the pole, to selectively release the hand grip from the housing.

The disengaging means includes a magneto device attached to the housing, and having a plunger attached to the bar, for moving the bar relative to the housing. The bar includes at least one extension extended therefrom, and the plunger of the magneto device is secured to the extension of the bar.

A spring member may further be provided for biasing the actuator flange of the bar to engage into the lock groove of the pole.

The disengaging means includes a lock device rotatably received in the housing, and a link coupled between the lock device and the bar, for moving the bar relative to the housing with the lock device.

The bar includes an oblong hole formed therein, the link includes a peg extended therefrom and slidably engaged into the oblong hole of the bar, to couple the link to the bar. The link includes a hole formed therein, the lock device includes a stud extended therefrom and engaged into the hole of the link, to couple the link to the lock device.

Another spring member may further be provided for biasing lock device to engage the actuator flange of the bar into the lock groove of the pole.

The housing includes at least one projection extended therefrom to define at least one depression therein, the catch includes at least one protrusion extended therefrom to selectively engage into the depression of the housing, and to engage with the projection, for selectively locking the catch to the housing, and to prevent the stem from being rotated relative to the housing.

The hand grip includes a first end pivotally secured to the stem with a shaft and having a space formed therein, and a cam received in the space of the hand grip, and a spring biased between the cam and the hand grip. The cam includes an ear extended therefrom, and the spring is engaged with the ear of the cam.

A sealing ring may further be provided for attaching to the pole, and for engaging with the housing, and for making a water tight seal between the pole and the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
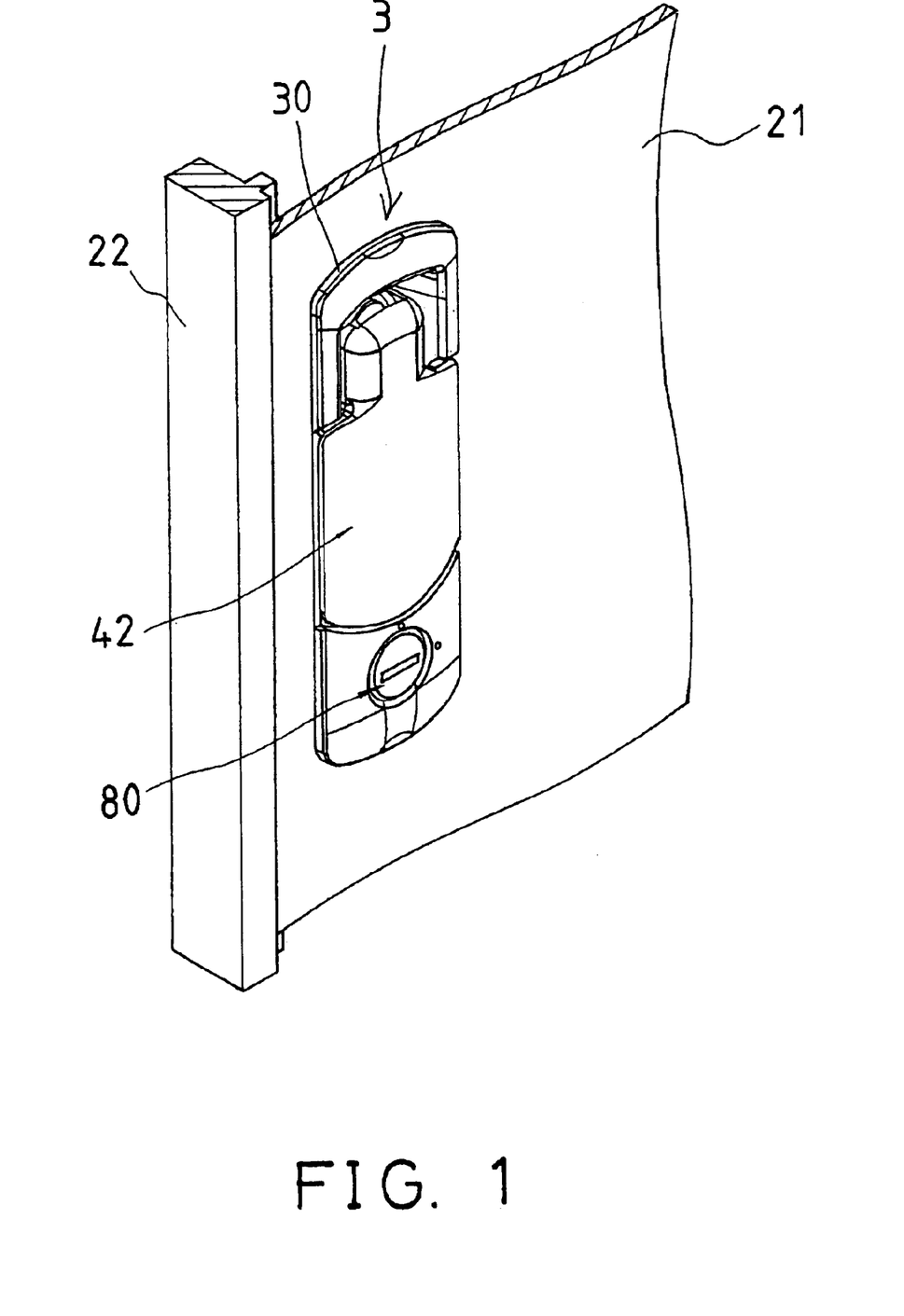
FIGS. 1 and 2 are partial perspective views illustrating the operation of a wall box for receiving electric wires or cables in accordance with the present invention.
Figure 2:
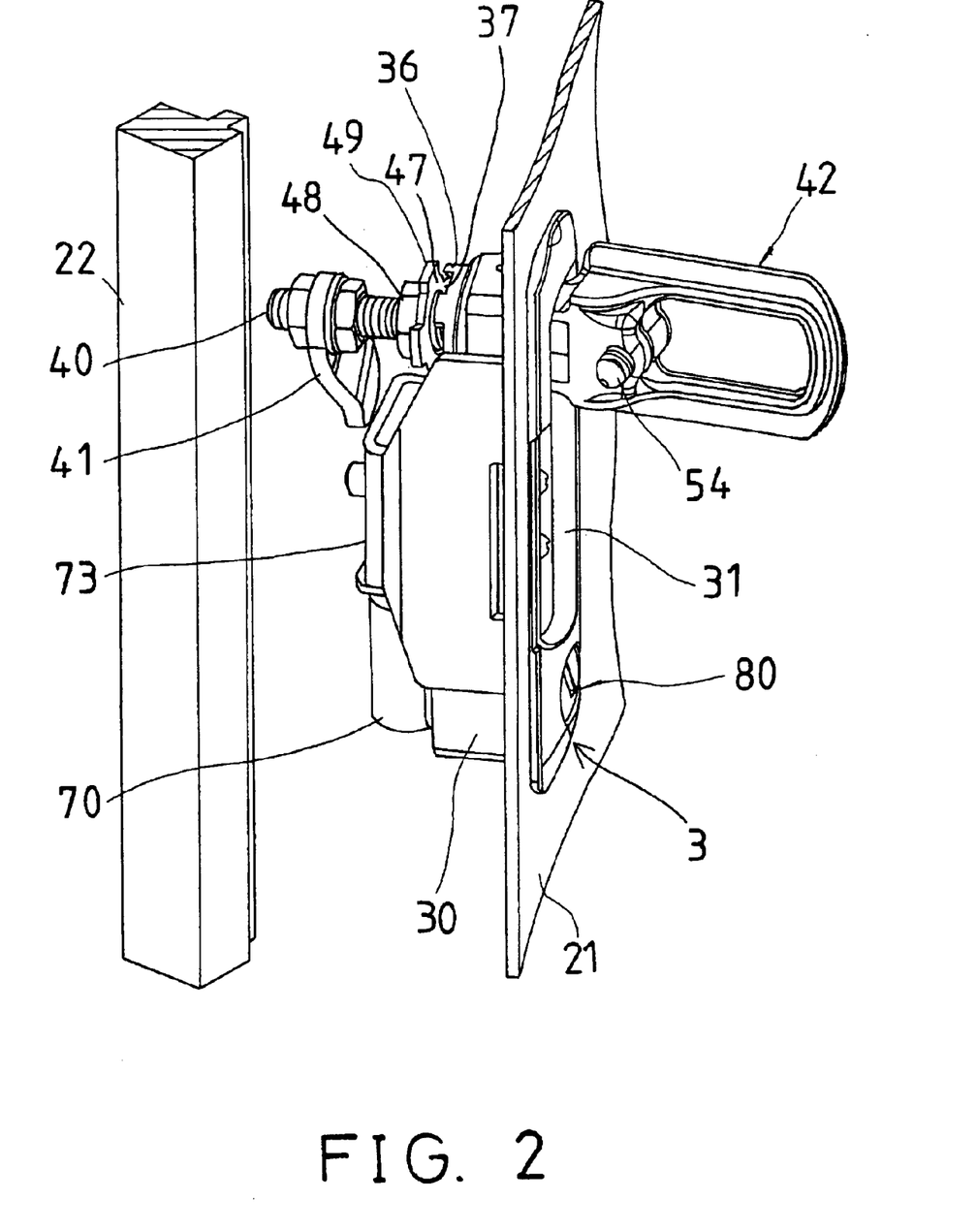

Referring to the drawings, and initially to FIGS. 1 and 2, a wall box 20 in accordance with the present invention is provided for receiving electric wires, switches, etc. therein, and for enclosing and shielding the electric wires and the switches, and is required to provide a door panel 21 for enclosing and opening the wall box 20.

The wall box 20 comprises a door panel 21 to be openably latched or locked to a receptacle or frame 22 with a latch device 3 which includes a housing 30 secured to the door panel 21 with fasteners (not shown) or rivets, or by welding processes. The details of the latch device 3 will be described in details hereinafter.

Figure 3:
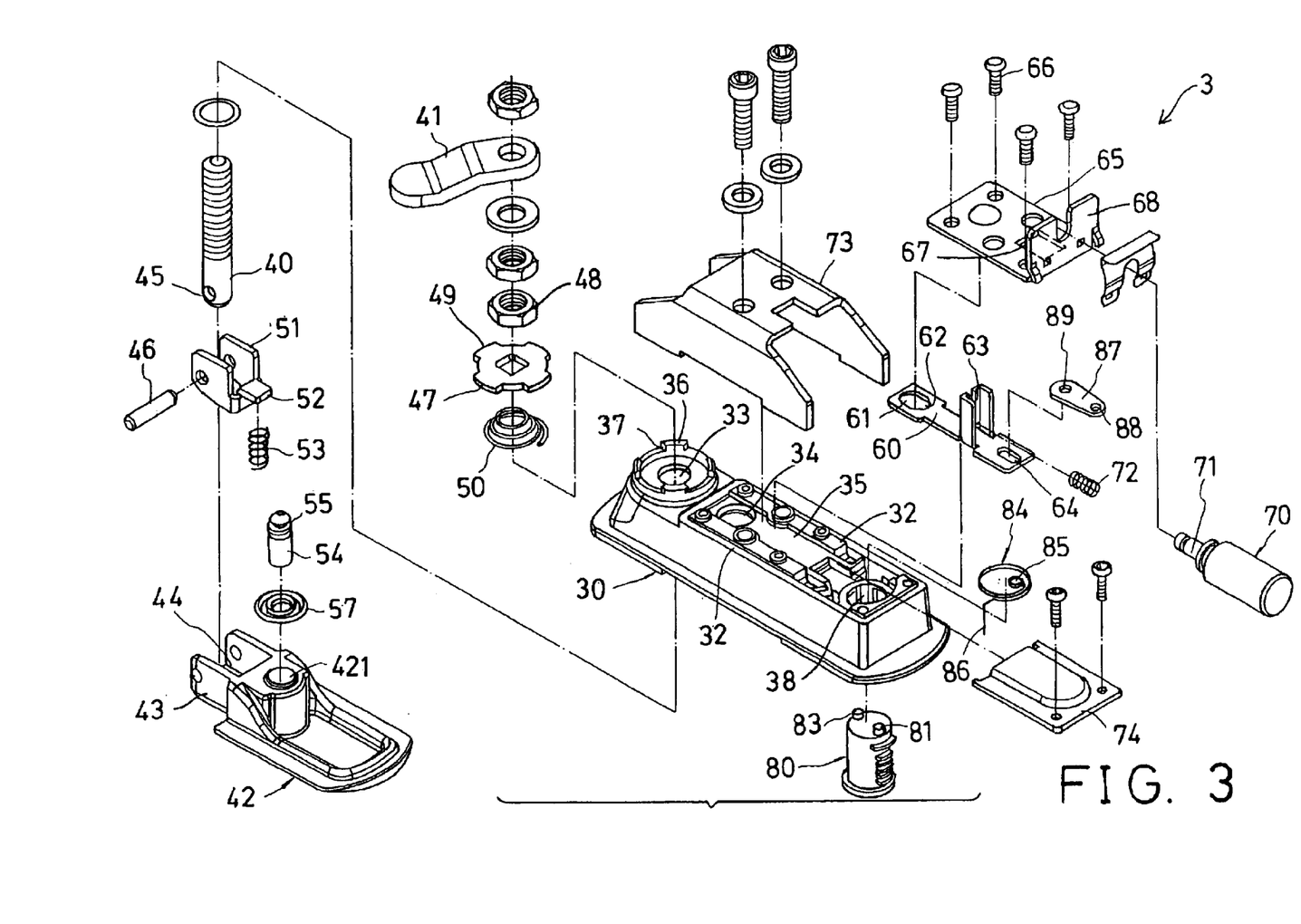
FIG. 3 is an exploded view of the wall box for receiving electric wires or cables.

The housing 30 of the latch device 3 includes a chamber 31 formed therein and defined by a bottom wall 32 which has an orifice 33 and an aperture 34 formed therein, a channel 35 formed in the bottom wall 32 and communicating with the aperture 34 of the bottom wall 32, and one or more projections 36 extended from the bottom wall 32 and having one or more depressions 37 formed between the projections 36.

A stem 40 is slidably engaged through the orifice 33 of the housing 30, and a tongue 41 is secured to the stem 40 and rotated in concert with the stem 40, for being actuated to engage with the frame 22 of the wall box 20 by the stem 40, in order to latch or lock or open the wall box 20.

Figure 4:
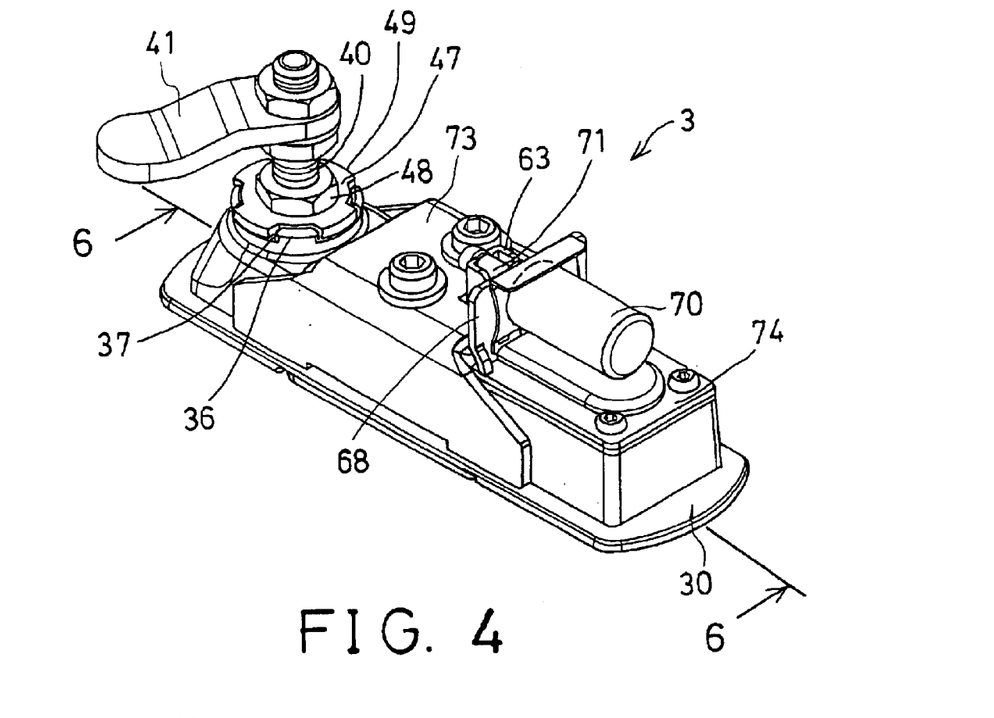
FIG. 4 is a perspective view of the latch device for the wall box.
Figure 5:
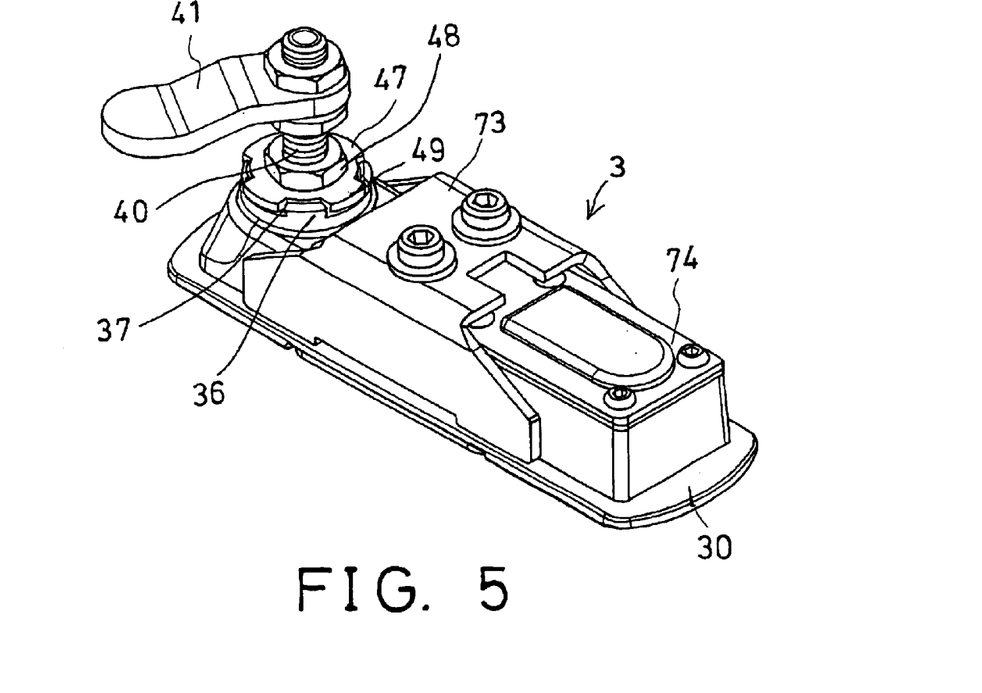
FIG. 5 is a perspective view similar to FIG. 4, illustrating a simplified structure of the latch device having a magneto device removed therefrom.

A hand grip 42 includes one end 43 having a space 44 formed therein, and pivotally or rotatably secured to one end 45 of the stem 40 with a shaft 46, for moving the stem 40 relative to the housing 30. A catch 47 is secured to the stem 40 with such as fasteners 48, and includes one or more protrusions 49 extended therefrom for selectively engaging into the depressions 37 of the housing 30, and for engaging with the projections 36, and thus for selectively locking the catch 47 and the stem 40 to the housing 30 (FIGS. 4–6), in order to prevent the stem 40 and the tongue 41 from being rotated relative to the housing 30.

A spring member 50 may be provided and engaged onto the stem 40, and biased or engaged between the catch 47 and the housing 30, for biasing the catch 47 away from the projections 36 of the housing 30 (FIGS. 2, 7), and thus for allowing the catch 47 and the stem 40 and the tongue 41 to be rotated relative to the housing 30 by the hand grip 42.

Figure 7:
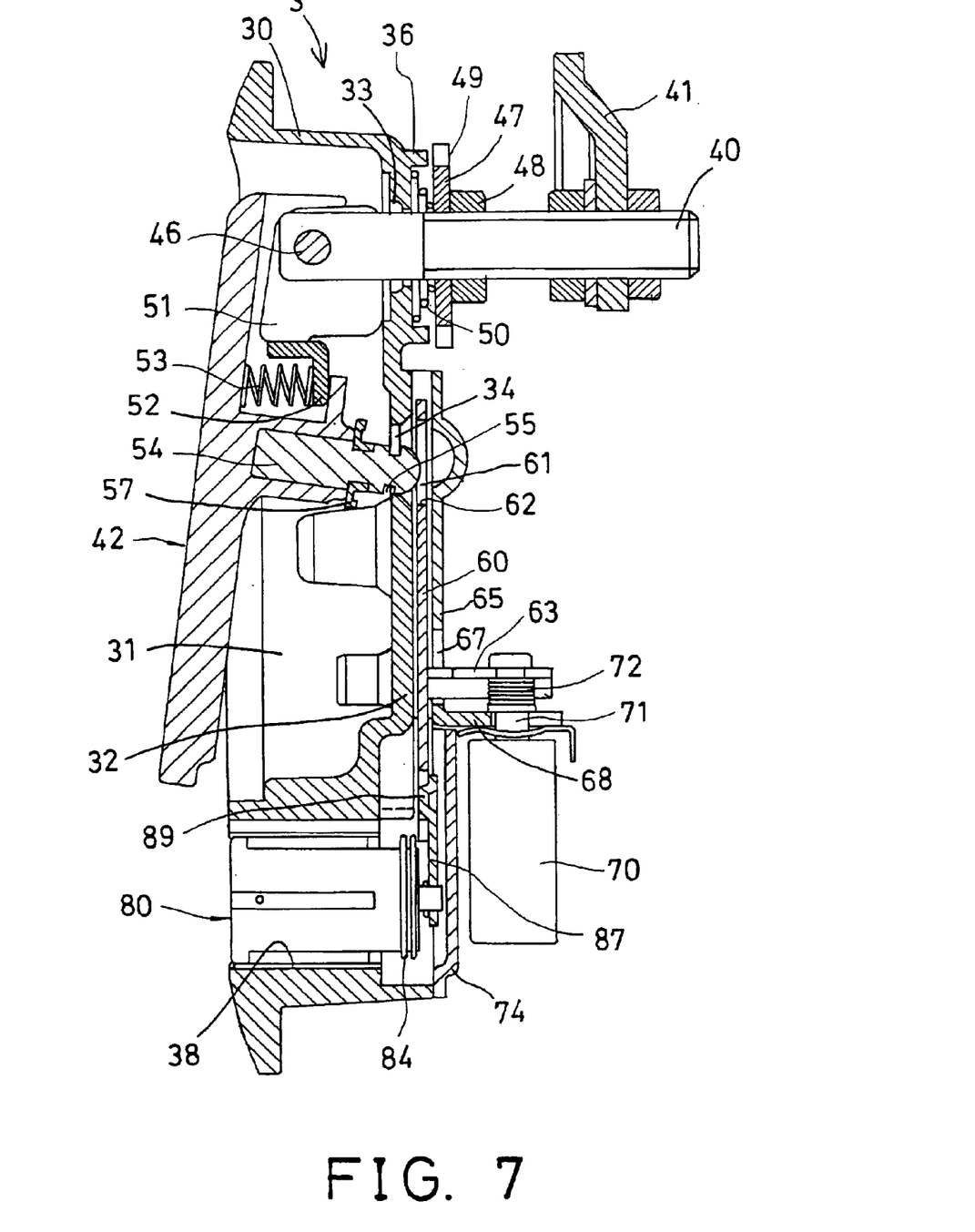
FIG. 7 is a cross sectional view similar to FIG. 6, illustrating the operation of the latch device for the wall box.

A cam 51 is received in the space 44 of the hand grip 42 and also pivotally or rotatably secured to one end of the stem 40 with the shaft 43, and includes an ear 52 extended therefrom, and a spring 53 is engaged between the ear 52 of the cam 51 and the hand grip 42, for biasing the hand grip 42 away from the cam 51 or out of the housing 30 partially (FIG. 7).

Figure 6:
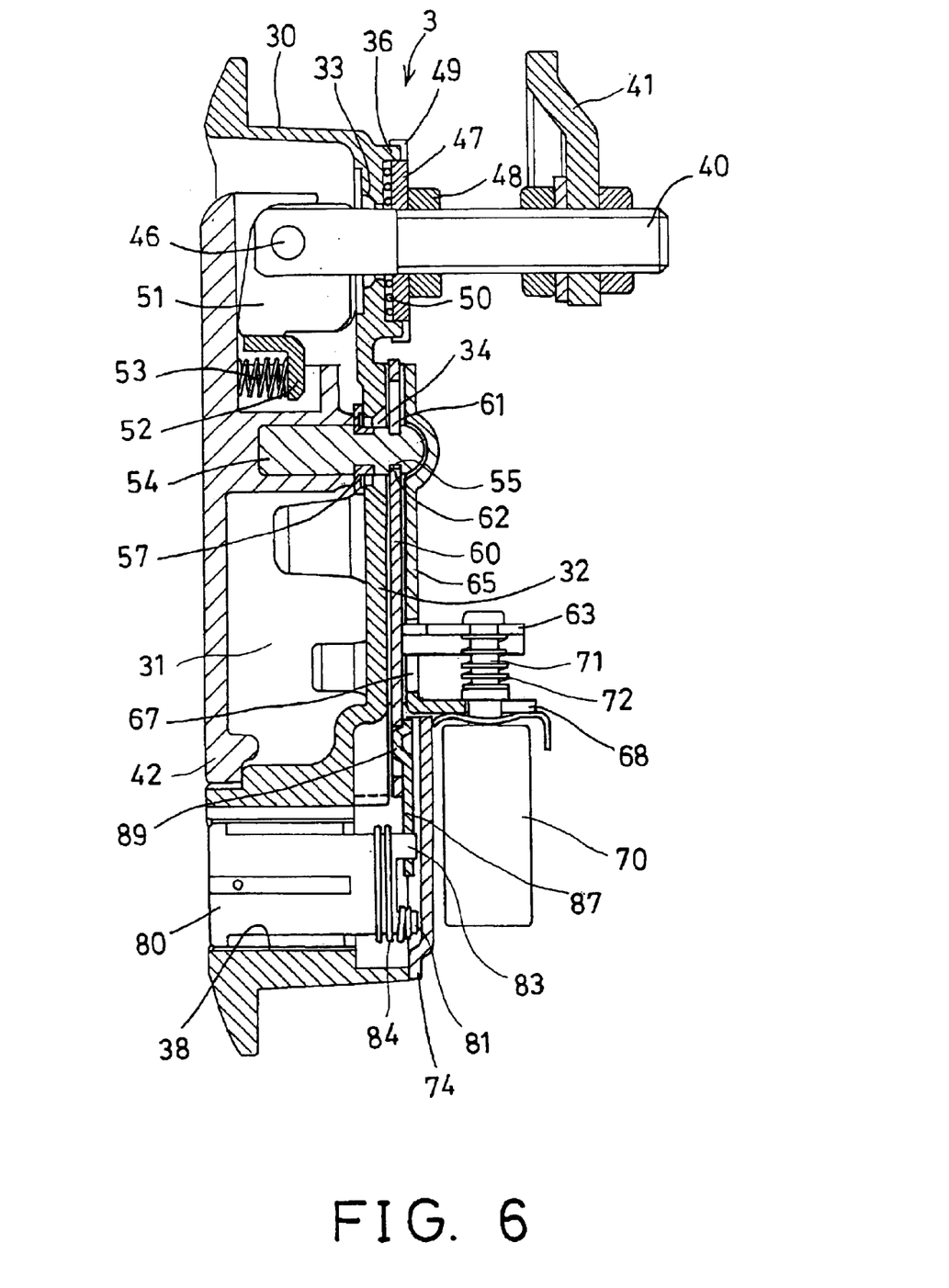
FIG. 6 is a cross sectional view taken along lines 6—6 of FIG. 4.

In operation, as shown in FIGS. 6, 7, the cam 51 is arranged for allowing the stem 40 and thus the catch 47 to be slightly moved relative to the housing 30, such as between the positions as shown in FIGS. 6 and 7, and arranged for allowing the catch 47 to be disengaged from the projections 36 of the housing (FIG. 7), when required.

A pole 54 is secured in a hole 421 of the hand grip 42, and includes a lock groove 55 formed in the free end thereof. A sealing ring 57 is secured to the pole 54, for engaging with the bottom wall 32 of the housing 30 (FIGS. 6, 11), and thus for making a water tight seal between the pole 54 and the hand grip 42 and the bottom wall 32 of the housing 30. The pole 54 is extendible out through the aperture 34 of the bottom wall 32 of the housing 30 (FIGS. 6–9).

A bar 60 is slidably received in the channel 35 of the housing 30, and includes an oblong hole 61 formed in one end thereof for slidably receiving the pole 54, and includes an actuator flange 62 formed thereon to define the oblong hole 61, and to selectively engage into the lock groove 55 of the pole 54 (FIGS. 6, 8, 11), and thus to lock the pole 54 and the hand grip 42 to the housing 30. The bar 60 includes one or more extensions 63 extended therefrom, and an oblong hole 64 formed in the other end thereof.

A board 65 is secured to the bottom wall 32 of the housing 30 with fasteners 66, and includes a channel 67 formed therein to slidably receive the extensions 63 of the bar 60, and includes a flap 68 extended therefrom. A magneto device 70 is secured to the flap 68 of the board 65, and includes a plunger 71 slidable and extendible outward therefrom and secured to the extensions 63 of the bar 60, for moving the bar 60 relative to the housing 30.

A spring member 72 may be engaged on the plunger 71 of the magneto device 70, and engaged or biased between the magneto device 70 and the extensions 63 of the bar 60, for recovering or biasing the extensions 63 of the bar 60 away from the magneto device 70, when the magneto device 70 is switched off or is not energized.

In operation, as shown in FIG. 6, when the magneto device 70 is switched off or is not energized, the spring member 72 may force and move the bar 60 relative to the housing 30, in order to bias the actuator flange 62 of the bar 60 to engage into the lock groove 55 of the pole 54, and thus to lock the pole 54 and the hand grip 42 to the housing 30.

When the magneto device 70 is switched on or is energized, as shown in FIG. 7, the plunger 71 of the magneto device 70 may pull and force the extensions 63 of the bar 60 toward the magneto device 70 against the spring member 72, in order to disengage the actuator flange 62 of the bar 60 from the lock groove 55 of the pole 54, and thus to release the pole 54 and the hand grip 42 from the housing 30. A cover 73 may be secured to the housing 30 for shielding the bar 60 and the other parts or elements.

When the pole 54 is released from the housing 30, the hand grip 42 may be rotated outwardly (FIG. 2), for rotating the tongue 41 away from the frame 22 of the wall box 20, so as to unlock or open the door panel 21 relative to the wall box 20.

The housing 30 further includes a space 38 formed therein to rotatably receive a lock device 80 therein which includes two studs 81, 83 extended therefrom. A spring member 84 includes one end 85 attached to one stud 81 of the lock device 80, and the other end 86 secured to the housing 30, for biasing or recovering the lock device 80.

A link 87 has a hole 88 formed in one end to receive the other stud 83 of the lock device 80, and a peg 89 extended from the other end to slidably engage into the oblong hole 64 of the bar 60. Another cover 74 may also be secured to the housing 30 for shielding the lock device 80 and the spring 84 and the other parts or elements.

Figure 8:
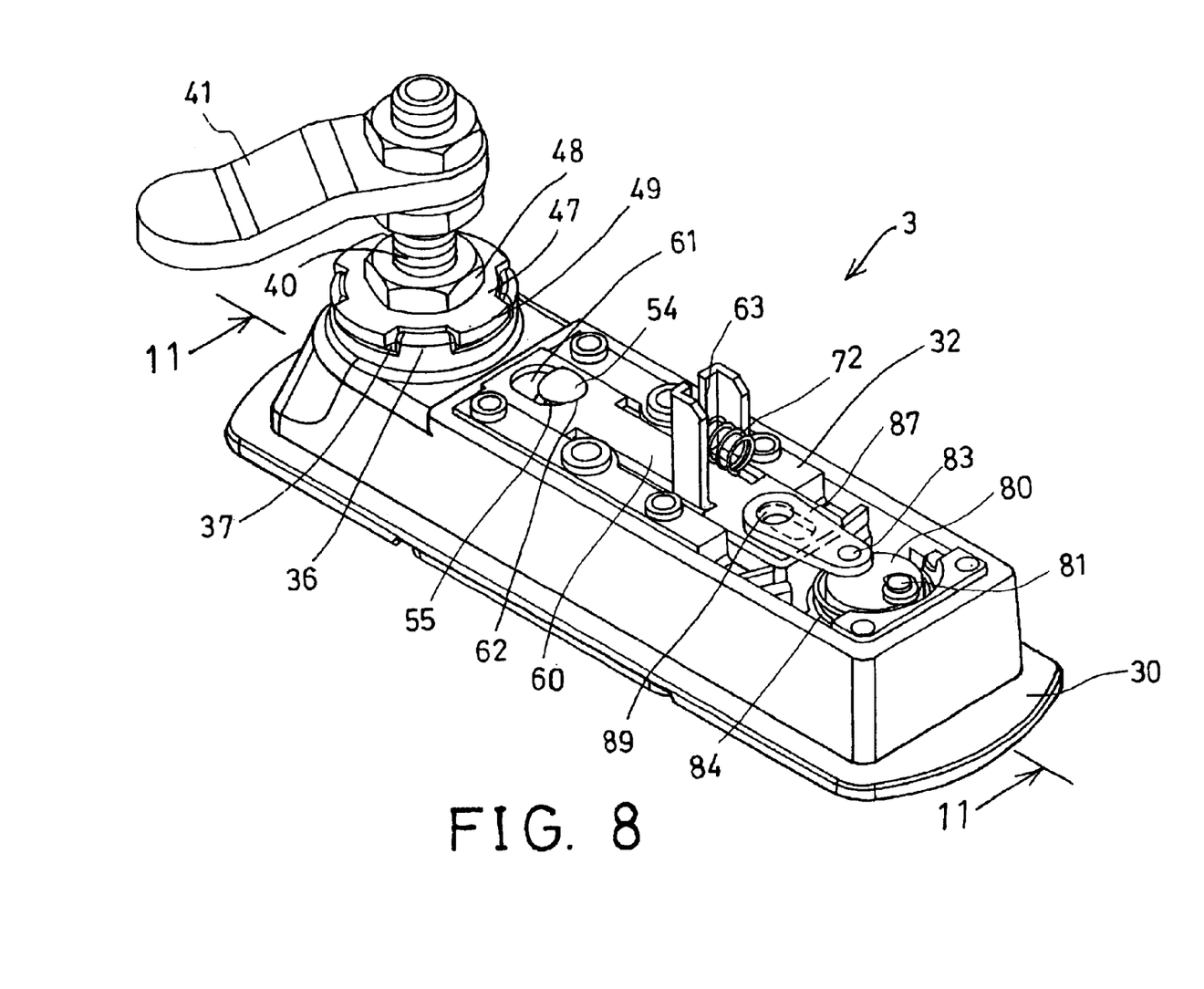
FIGS. 8, 9 are perspective views similar to FIGS. 4, 5, illustrating another simplified structure of the latch device having a cover removed therefrom.
Figure 9:
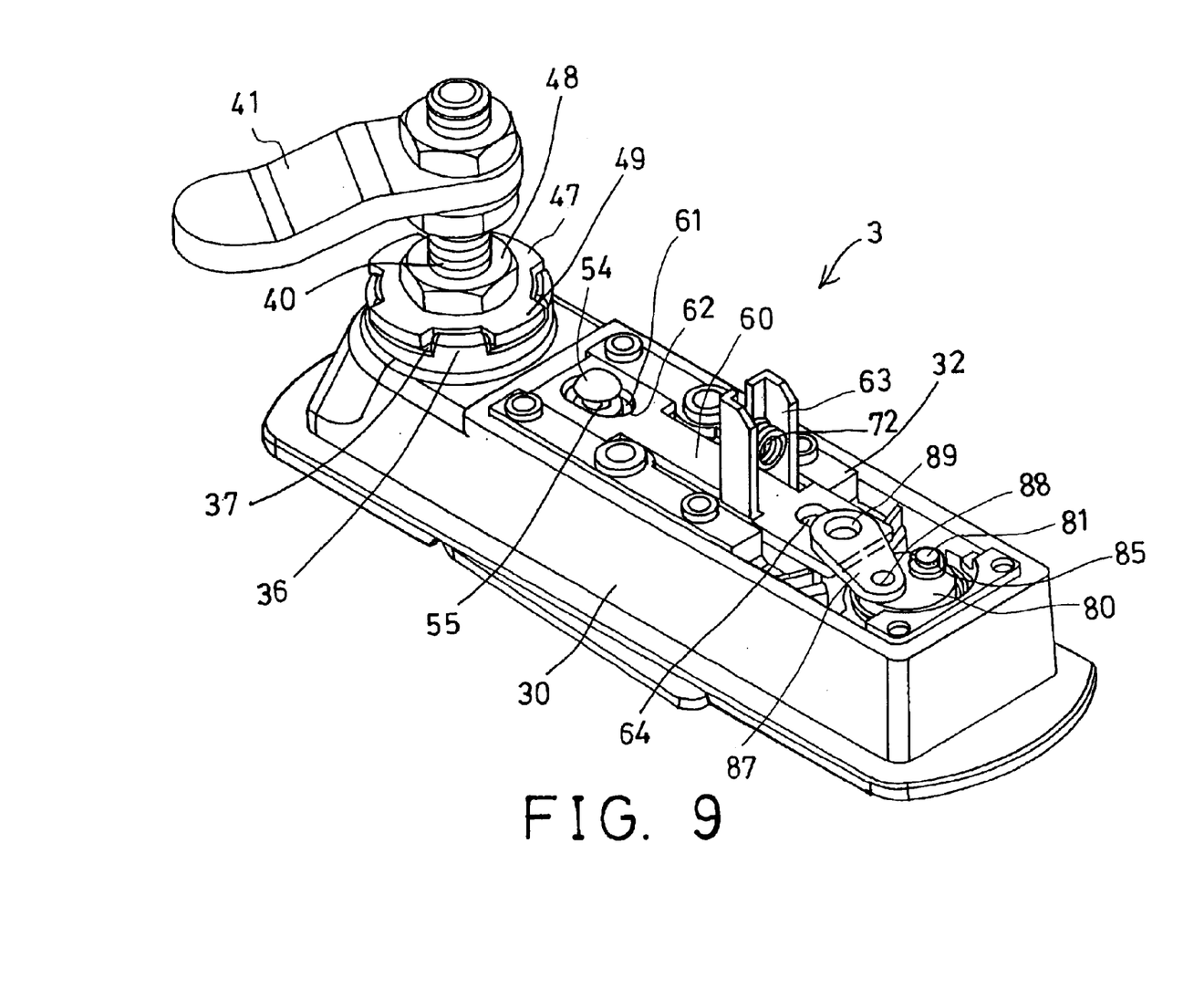
Figure 10:
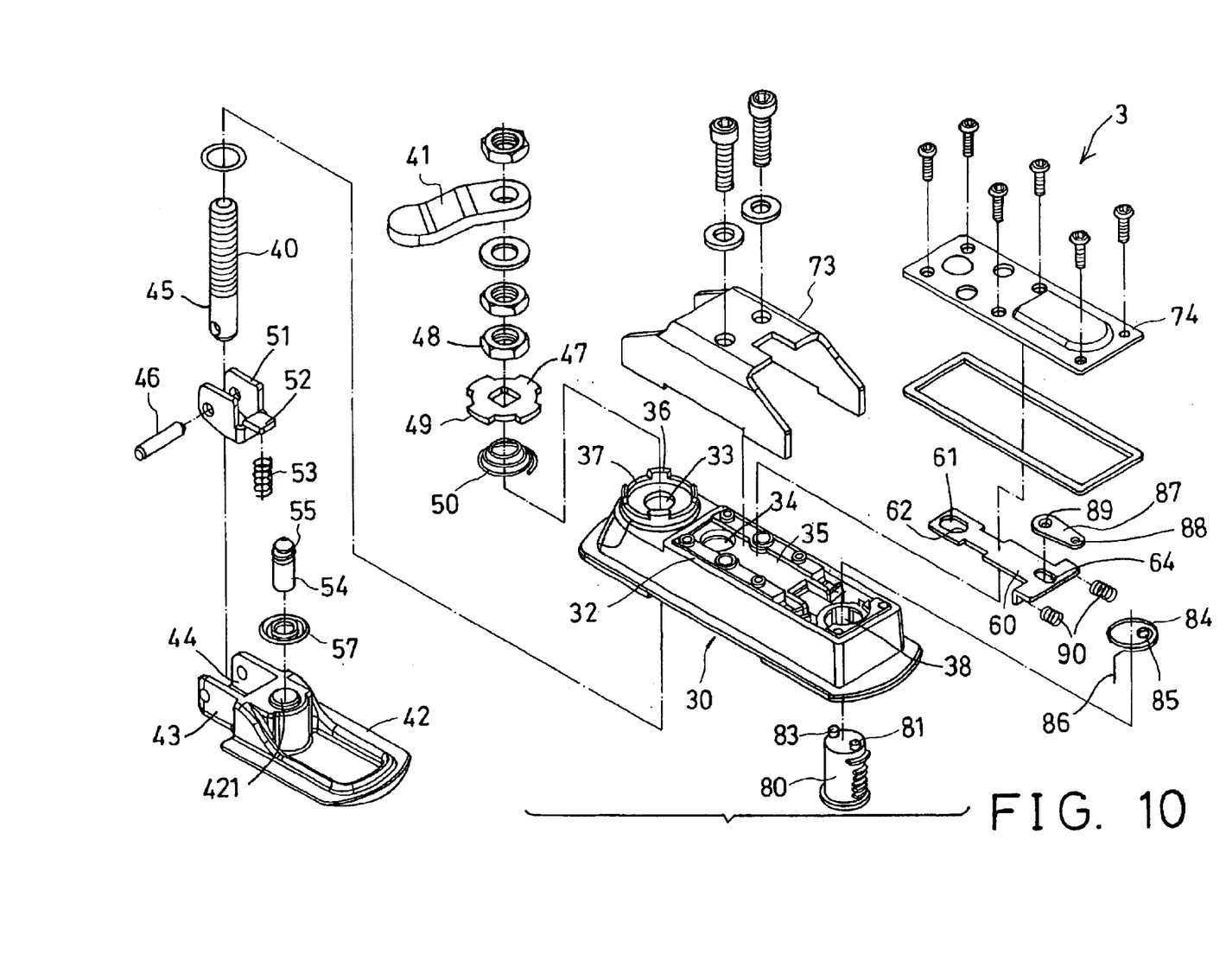
FIG. 10 is an exploded view of the latch device for the wall box as shown in FIGS. 8 and 9.
Figure 11:
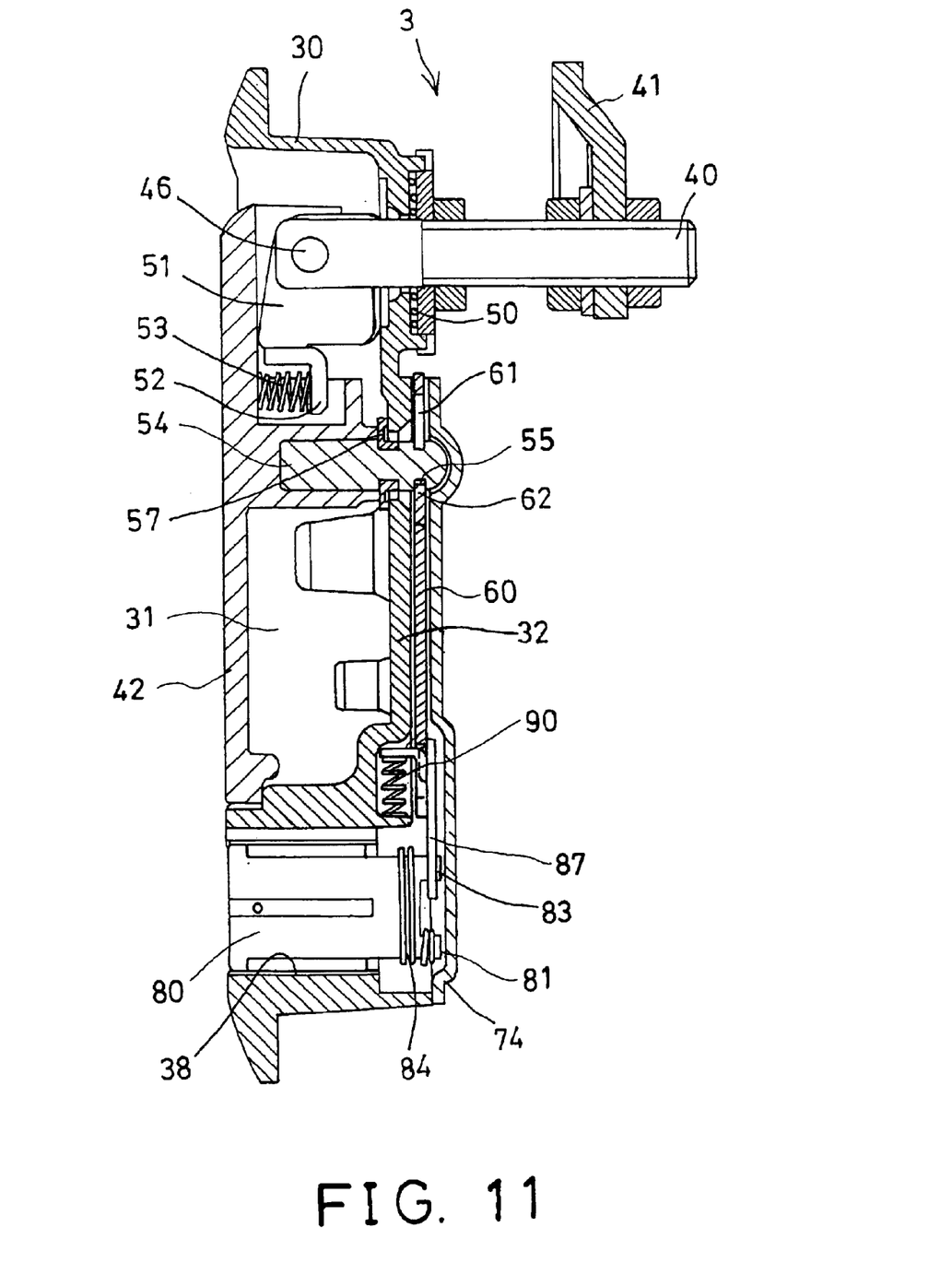
FIG. 11 is a cross sectional view taken along lines 11—11 of FIG. 8.

In operation, the spring 84 may be used to force and move the bar 60 relative to the housing 30, in order to bias the actuator flange 62 of the bar 60 to engage into the lock groove 55 of the pole 54, and thus to lock the pole 54 and the hand grip 42 to the housing 30 (FIGS. 8, 11). One or more further spring members 90 (FIGS. 10, 11) may be engaged between the bar 60 and the housing 30 for further biasing the actuator flange 62 of the bar 60 to engage into the lock groove 55 of the pole 54.

The bar 60 may be pulled toward the lock device 80 against the spring members 84, 90 by rotating the lock device 80 with a key (not shown), instead of the magneto device 70, in order to disengage the actuator flange 62 of the bar 60 from the lock groove 55 of the pole 54, and thus to release the pole 54 and the hand grip 42 from the housing 30.

Accordingly, the latch device of the wall box in accordance with the present invention includes a structure arranged for allowing the wall box to be easily actuated or opened by users without depressing any buttons.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A latch device for a wall box, said latch device comprising:

a housing, a stem slidably attached to said housing, a catch secured to said stem, for engaging with said housing to lock said stem to said housing, a first spring for biasing the catch away from said housing, a hand grip pivotally attached to said stem, for rotating said stem relative to said housing, a pole secured to said hand grip and including a lock groove formed therein, a bar slidably attached to said housing, and including an actuator flange provided therein for selectively engaging into said lock groove of said pole, to selectively lock said pole and said hand grip to said housing, and means for disengaging said actuator flange from said lock groove of said pole, to selectively release said hand grip from said housing.

2. The latch device as claimed in claim 1, wherein said disengaging means includes a magneto device attached to said housing, and having a plunger attached to said bar, for moving said bar relative to said housing.

3. The latch device as claimed in claim 2, wherein said bar includes at least one extension extended therefrom, and said plunger of said magneto device is secured to said at least one extension of said bar.

4. The latch device as claimed in claim 3 further comprising a spring for biasing said actuator flange of said bar to engage into said lock groove of said pole.

5. The latch device as claimed in claim 1, wherein said disengaging means includes a lock device rotatably received in said housing, and a link coupled between said lock device and said bar, for moving said bar relative to said housing with said lock device.

6. The latch device as claimed in claim 5, wherein said bar includes an oblong hole formed therein, said link includes a peg extended therefrom and slidably engaged into said oblong hole of said bar, to couple said link to said bar.

7. The latch device as claimed in claim 5, wherein said link includes a hole formed therein, said lock device includes a stud extended therefrom and engaged into said hole of said link, to couple said link to said lock device.

8. The latch device as claimed in claim 5 further comprising a spring for biasing lock device to engage said actuator flange of said bar into said lock groove of said pole.

9. The latch device as claimed in claim 1, wherein said housing includes at least one projection extended therefrom to define at least one depression therein, said catch includes at least one protrusion extended therefrom to selectively engage into said at least one depression of said housing, and to engage with said at least one projection, for selectively locking said catch to said housing, and to prevent said stem from being rotated relative to said housing.

10. The latch device as claimed in claim 1, wherein said hand grip includes a first end pivotally secured to said stem with a shaft and having a space formed therein, and a cam received in said space of said hand grip, and a spring biased between said cam and said hand grip.

11. The latch device as claimed in claim 10, wherein said cam includes an ear extended therefrom, and said spring is engaged with said ear of said cam.

12. The latch device as claimed in claim 1 further comprising a sealing ring attached to said pole, for engaging with said housing, and for making a water tight seal between said pole and said housing.

* * * * *